United States Patent
Saint-Raymond et al.

(10) Patent No.: US 10,941,474 B2
(45) Date of Patent: *Mar. 9, 2021

(54) APPARATUS FOR THE CONTINUOUS HOT DIP COATING OF A METAL STRIP WITH REAR POURING COMPARTMENT OPTIMALLY ANGLED WITH THE PASSAGE PLANE OF THE METAL STRIP

(71) Applicant: ArcelorMittal, Luxembourg (LU)

(72) Inventors: Hubert Saint-Raymond, Metz (FR); José Veg, Brenouille (FR); Didier Dauchelle, Creil (FR)

(73) Assignee: ARCELORMITTAL, Luxembourg (LU)

( * ) Notice: Subject to any disclaimer, the term of this patent is extended or adjusted under 35 U.S.C. 154(b) by 81 days.

This patent is subject to a terminal disclaimer.

(21) Appl. No.: 16/171,140

(22) PCT Filed: Apr. 26, 2017

(86) PCT No.: PCT/IB2017/052413
§ 371 (c)(1),
(2) Date: Oct. 25, 2018

(87) PCT Pub. No.: WO2017/187364
PCT Pub. Date: Nov. 2, 2017

(65) Prior Publication Data
US 2019/0062888 A1      Feb. 28, 2019

(30) Foreign Application Priority Data
Apr. 26, 2016    (WO) ................ PCT/IB2016/052358

(51) Int. Cl.
C23C 2/00       (2006.01)
C23C 2/06       (2006.01)
(Continued)

(52) U.S. Cl.
CPC ............ *C23C 2/003* (2013.01); *C23C 2/06* (2013.01); *C23C 2/12* (2013.01); *C23C 2/40* (2013.01);
(Continued)

(58) Field of Classification Search
CPC .................................................... C23C 2/003
(Continued)

(56) References Cited

U.S. PATENT DOCUMENTS 6,923,864 B2    8/2005   Dauchelle et al.
9,745,653 B2    8/2017   Schaffrath et al.
(Continued)

FOREIGN PATENT DOCUMENTS

JP       H0728958 U    5/1995
JP       2000265217 A  9/2000
(Continued)

*Primary Examiner* — Karl Kurple
(74) *Attorney, Agent, or Firm* — Davidson, Davidson & Kappel, LLC (57) ABSTRACT

An apparatus for the continuous hot dip coating of a metal strip is provided The apparatus includes a vessel intended to contain a liquid metal bath, a bottom roller and a scroll casing of the metal strip. The casing includes, at its lower end, a pouring box delimiting a front pouring compartment for liquid metal and a rear pouring compartment for liquid metal. Each pouring compartment is inwardly delimited by an inner wall and outwardly delimited by an outer wall. The outer wall of the rear pouring compartment forms, with the passage plane of the metal strip, an angle greater than or equal to 15° in the usage configuration. A method is also provided.

29 Claims, 6 Drawing Sheets

(51) Int. Cl.
    *C23C 2/12*     (2006.01)
    *C23C 2/40*     (2006.01)
    *B05D 1/18*     (2006.01)
    *B32B 15/01*     (2006.01)

(52) U.S. Cl.
    CPC ............ *B05D 1/18* (2013.01); *B05D 2202/00* (2013.01); *B05D 2256/00* (2013.01); *B32B 15/012* (2013.01)

(58) Field of Classification Search
    USPC .......................................................... 118/68
    See application file for complete search history.

(56) References Cited

U.S. PATENT DOCUMENTS

| | | | | |
|---|---|---|---|---|
| 2004/0028832 A1* | 2/2004 | Dauchelle | ................ | C23C 2/00 427/431 |
| 2016/0102393 A1* | 4/2016 | Schaffrath | ................ | C23C 2/40 118/713 |
| 2019/0144982 A1* | 5/2019 | Veg | ......................... | C23C 2/003 118/400 |

FOREIGN PATENT DOCUMENTS

| | | | |
|---|---|---|---|
| JP | 2012021206 | A | 2/2012 |
| KR | 101533212 | B1 | 7/2015 |
| WO | 0238823 | A1 | 5/2002 |
| WO | 2014173663 | A1 | 10/2014 |

* cited by examiner

APPARATUS FOR THE CONTINUOUS HOT DIP COATING OF A METAL STRIP WITH REAR POURING COMPARTMENT OPTIMALLY ANGLED WITH THE PASSAGE PLANE OF THE METAL STRIP

The invention relates to an apparatus for the continuous hot dip coating of a metal strip.

BACKGROUND OF THE INVENTION

Patent application EP 1 339 891 describes a coating apparatus including a displacement casing for the metal strip in a protective atmosphere and whose lower end is immersed in the liquid metal bath to determine with the surface of said bath and inside this casing, a liquid metal seal. The casing delimits, at its lower end, at least two compartments for pouring liquid metal, in which liquid metal from the bath is poured from the liquid seal in order to clean the liquid seal of impurities that may create flaws in the coating of the strip. The outer walls of the casing extend substantially parallel to the passage plane of the strip over their entire length, including in the portion delimiting the pouring compartments.

Such an apparatus is not fully satisfactory. Indeed, the inventors of the present invention have noted that, during the use of such an apparatus, liquid metal projections were being produced on the face of the strip opposite the bottom roller, resulting in an unsatisfactory coating quality on this face of the strip.

BRIEF SUMMARY OF THE INVENTION

An object of the invention is therefore to provide an apparatus for continuous hot dip coating making it possible to obtain coated strips whereof the coating has a low defect density on each of the faces of the strip.

The present invention provides a coating apparatus as cited above, including:
  a vessel intended to contain a liquid metal bath,
  a bottom roller arranged in the vessel and intended to be immersed in the liquid metal bath,
  a displacement casing for the metal strip, the lower end of which is immersed in the liquid metal bath to determine, with the surface of said bath and the inside of said casing, a liquid metal seal,
the casing carrying, at its lower end, a pouring box delimiting a front pouring compartment for liquid metal, located on the side of the face of the metal strip placed on the side of the bottom roller and a rear pouring compartment for liquid metal, located facing the face of the metal strip which is not located on the side of the bottom roller, each pouring compartment being inwardly delimited by an inner wall and outwardly by an outer wall, the upper rim of each inner wall being intended to be arranged below the liquid seal surface to perform a flow from said surface in each of said pouring compartments, the outer wall of the rear pouring compartment forming, with the passage plane of the metal strip, an angle greater than or equal to 15° in a usage configuration.

Additional features of the coating apparatus may include one or more of the following:
  the outer wall of the rear pouring compartment forms, with the metal strip, an angle strictly greater than 15°;
  the outer wall of the rear pouring compartment forms, with the passage plane of the strip, an angle α between $\alpha_0 - 10°$ and $\alpha_0 + 50°$, and more particularly between $\alpha_0$ and $\alpha_0 + 45°$, where $\alpha_0$ is the angle between the passage plane of the strip and the vertical, the angle $\alpha_0$ preferably being between 25° and 50°;
  the outer wall of the rear pouring compartment forms, with the passage plane of the strip, an angle α strictly greater than the angle $\alpha_0$ of the passage plane of the strip with the vertical;
  the outer wall of the rear pouring compartment is vertical;
  the inner wall of the rear pouring compartment is angled, toward the bottom of the compartment, away from a median vertical plane between the upper rims of the inner walls of the front and rear pouring compartments;
  the inner wall of the rear pouring compartment forms, with the vertical, an angle greater than or equal to 15°;
  the inner wall of the front pouring compartment forms, with the vertical, an angle greater than or equal to 15°;
  the inner wall of the front pouring compartment forms, with the vertical, an angle strictly greater than the angle formed between the passage plane of the strip and the vertical;
  the inner walls of the front and rear pouring compartments are tapered at their upper rims;
  the casing includes an upper portion and a lower portion, the lower portion carrying the pouring box, and the casing provided with the pouring box is rotatable relative to the metal strip around a first rotation axis and the pouring box is rotatable relative to the upper portion of the casing around a second rotation axis;
  the articulation allowing the rotation of the pouring box relative to the upper portion of the casing is a pivot link;
  the apparatus further includes a mechanism for adjusting the horizontality of the upper rims of the inner walls of the pouring compartments;
  the pouring box is stationary relative to the lower portion of the casing and the lower portion of the casing is mounted rotatable around the second rotation axis on the upper portion of the casing;
  the pouring box is mounted rotating on the lower portion of the casing.

The invention also provides a method for continuous hot dip coating of a metal strip using a coating apparatus as previously defined.

Additional features of the coating method may include one more of the following:
  during the coating method, a coating comprising zinc and aluminum, in particular an Aluminum-Zinc coating, for example comprising 55 wt % of aluminum, 43.5 wt % of zinc and 1.5 wt % of silicon, is deposited on the metal strip;
  during the coating method, a zinc-based coating comprising aluminum is deposited on the metal strip;
  during the coating method, a coating comprising between 0.1 and 0.3% aluminum is deposited on the metal strip;
  during the coating method, a coating comprising 5% aluminum, the rest being zinc is deposited on the metal strip;
  during the coating method, a zinc-based coating comprising magnesium and optionally aluminum, and preferably comprising from 0.1 to 20 wt % of aluminum and from 0.1 to 10 wt % of magnesium, is deposited on the metal strip;
  during the coating method, an aluminum-based coating comprising silicon and iron, in particular a coating having the following composition:

$8\% \leq Si \leq 11\%$ $2\% \leq Fe \leq 4\%$, the rest being aluminum and possible impurities is deposited on the metal strip.

BRIEF DESCRIPTION OF THE DRAWINGS

The invention will be better understood upon reading the following description, provided solely as an example, and in reference to the drawings, in which.

DETAILED DESCRIPTION OF THE DRAWINGS

Hereinafter, the description will be described for an apparatus for continuous galvanizing of a metal strip 1. However, the invention applies to any method for continuous hot dip coating in which surface pollution appears and for which a clean liquid seal must be retained.

In particular, it may advantageously be implemented for depositing coatings comprising zinc and aluminum, in particular aluminum-based coatings comprising zinc, called Aluminum-Zinc coatings, for example comprising 55 wt % of aluminum, 43.5 wt % of zinc and 1.5 wt % of silicon, such as the ALUZINC sold by ArcelorMittal or zinc-based coatings comprising aluminum, and in particular with a base of zinc comprising 0.1 to 0.3% aluminum, called GI coatings, or coatings comprising 5% aluminum, the rest being zinc and possible impurities.

The apparatus may also be used to deposit zinc-based coatings comprising magnesium, called Zinc-Magnesium or Zn—Mg coatings. Advantageously, such coatings further comprise aluminum, and are then called Zinc-Aluminum-Magnesium or Zn—Al—Mg coatings. Advantageously, the galvanizing apparatus 10 is provided for depositing Zn—Al—Mg coatings comprising from 0.1 to 20 wt % of aluminum and from 0.1 to 10 wt % of magnesium.

The apparatus 10 may also be used to deposit aluminum-based coatings comprising silicon, in particular for depositing coatings having the following composition:

$8\% \leq Si \leq 11\%$ $2\% \leq Fe \leq 4\%$, the rest being aluminum and possible impurities.

The metal strip 1 is in particular a strip made from steel. However, it could be made from other metal materials.

First, upon leaving the cold rolling train, the metal strip 1 enters an annealing furnace, not shown, in order to recrystallize it after the significant work hardening related to the cold rolling, and to prepare its chemical surface state in order to promote the chemical reactions necessary for the galvanizing operation. In this furnace, the metal strip 1 is brought to a temperature for example between 650 and 900° C.

Figure 1:
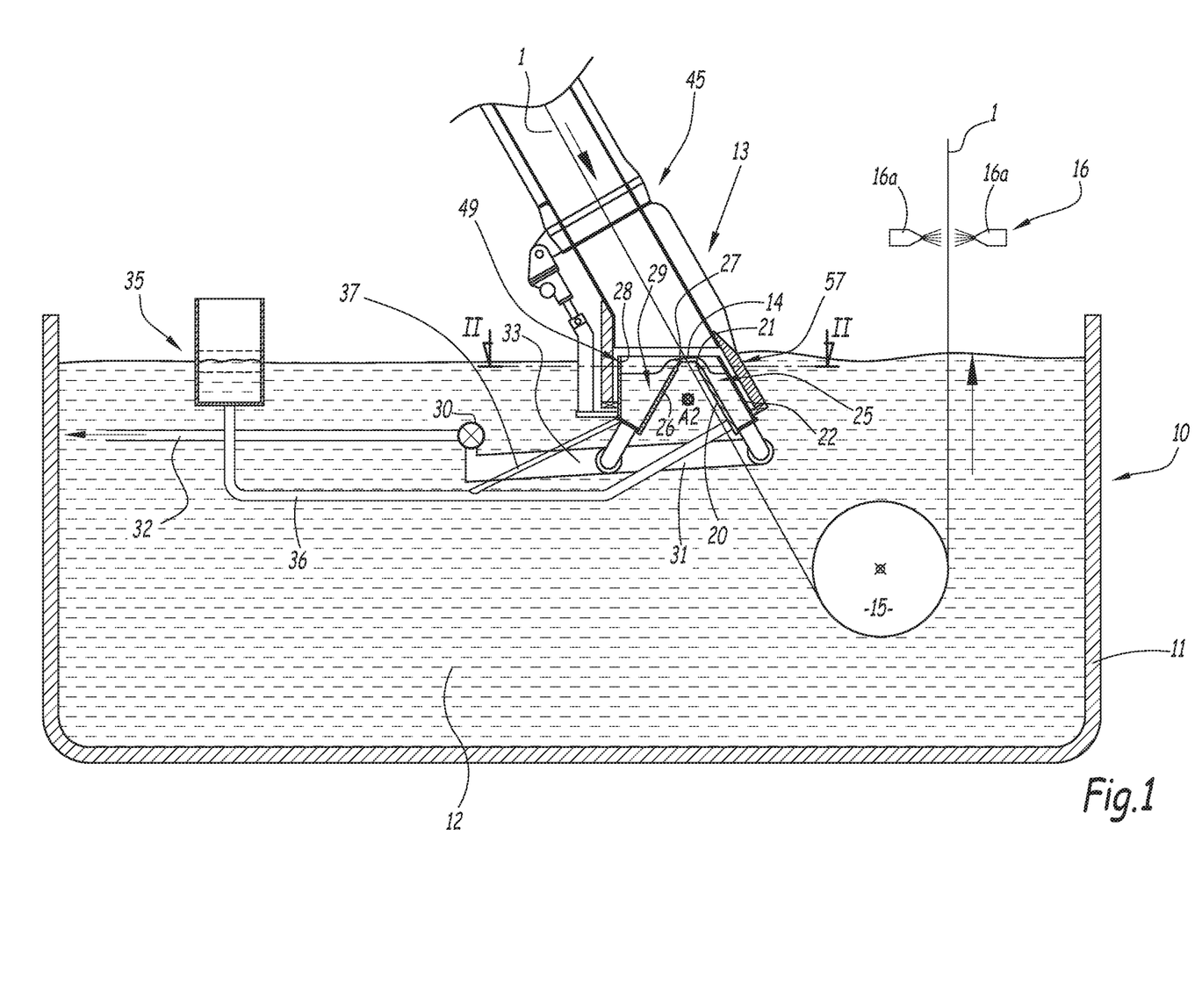
FIG. 1 is a general schematic view of a coating apparatus according to a first embodiment of the invention.

Upon leaving the annealing furnace, the metal strip 1 enters a galvanizing apparatus shown in FIG. 1 and designated by general reference 10.

This apparatus 10 comprises a vessel 11 containing a liquid metal bath 12.

The composition of the liquid metal bath 12 depends on the composition of the coating that one wishes to deposit on the strip 1. Aside from zinc, magnesium and/or aluminum in appropriate proportions depending on the coating to be deposited, the bath 12 may also contain up to 0.3 wt % of optional additional elements such as Si, Sb, Pb, Ti, Ca, Mn, Sn, La, Ce, Cr, Ni or Bi. These various additional elements may in particular make it possible to improve the ductility or adhesion of the metal coating on the strip 1. One skilled in the art who knows their effects on the characteristics of the metal coating will know how to use them based on the complementary aim sought. The bath 12 may lastly contain residual elements coming from the supplied ingots or resulting from the passage of the strip 1 in the bath 12, source of inevitable impurities in the metal coating.

The temperature of the liquid metal bath 12 is generally between 400 and 700° C.

Upon leaving the annealing furnace, the metal strip 1 is cooled to a temperature close to that of the liquid metal bath 12 using exchangers and is next immersed in the bath 12.

As shown in FIG. 1, the coating apparatus 10 comprises a casing 13 inside which the metal strip 1 travels under a protective atmosphere with respect to the metal from which it is made.

Figure 4:
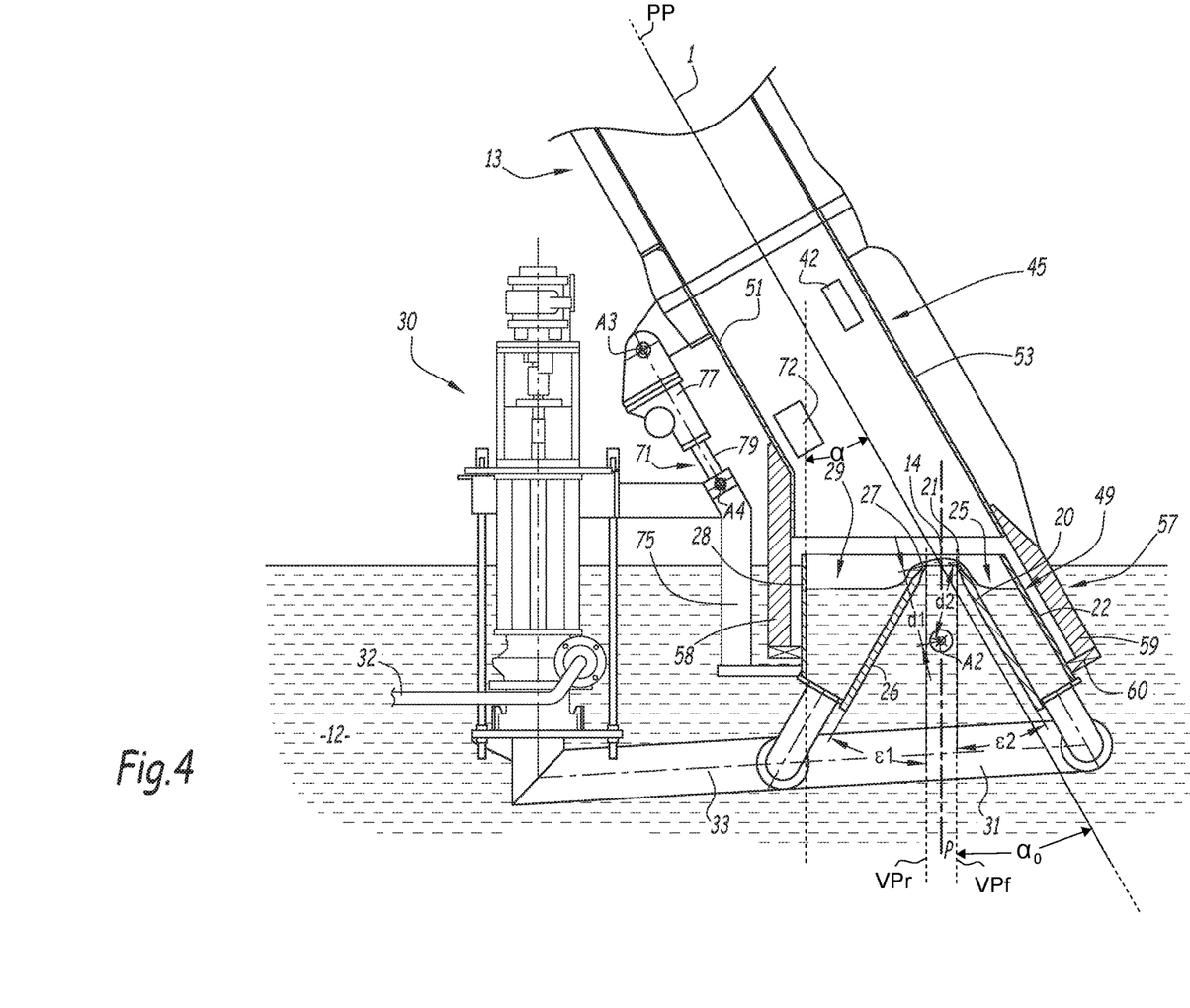
FIG. 4 is an enlarged view of a detail of FIG. 3.

During the use of the apparatus 10, the metal strip 1 travels through the casing 13 along a predefined passage plane PP (FIG. 4).

This casing 13, also called "immersion tunnel" or "snout", has a rectangular cross-section in the example embodiment shown in the Figures.

The casing 13 is immersed, at its lower portion, in the bath 12 so as to determine a liquid seal 14 with the surface of said bath 12 and inside said casing 13. Thus, the strip 1, upon being immersed in the liquid bath 12, passes through the surface of the liquid seal 14 in the casing 13.

The metal strip 1 is deflected by a roller 15, commonly called bottom roller and arranged in the bath 12.

The predefined passage plane PP of the metal strip 1 through the casing 13 is in particular determined by the geometry of the bottom roller 15 and of an upper roller (not shown) located upstream from the casing 13, as well as by the relative positions of these two rollers.

The bottom roller 15 and the upper roller thus form means for displacing the metal strip along the predetermined passage plane PP.

At the outlet of said bath 12, the coated strip 1 passes in wiping means 16 that are for example made up of nozzles 16a for spraying gas, such as nitrogen or air, and that are oriented toward each face of the strip 1 to regulate the thickness of the liquid metal coating.

Figure 3:
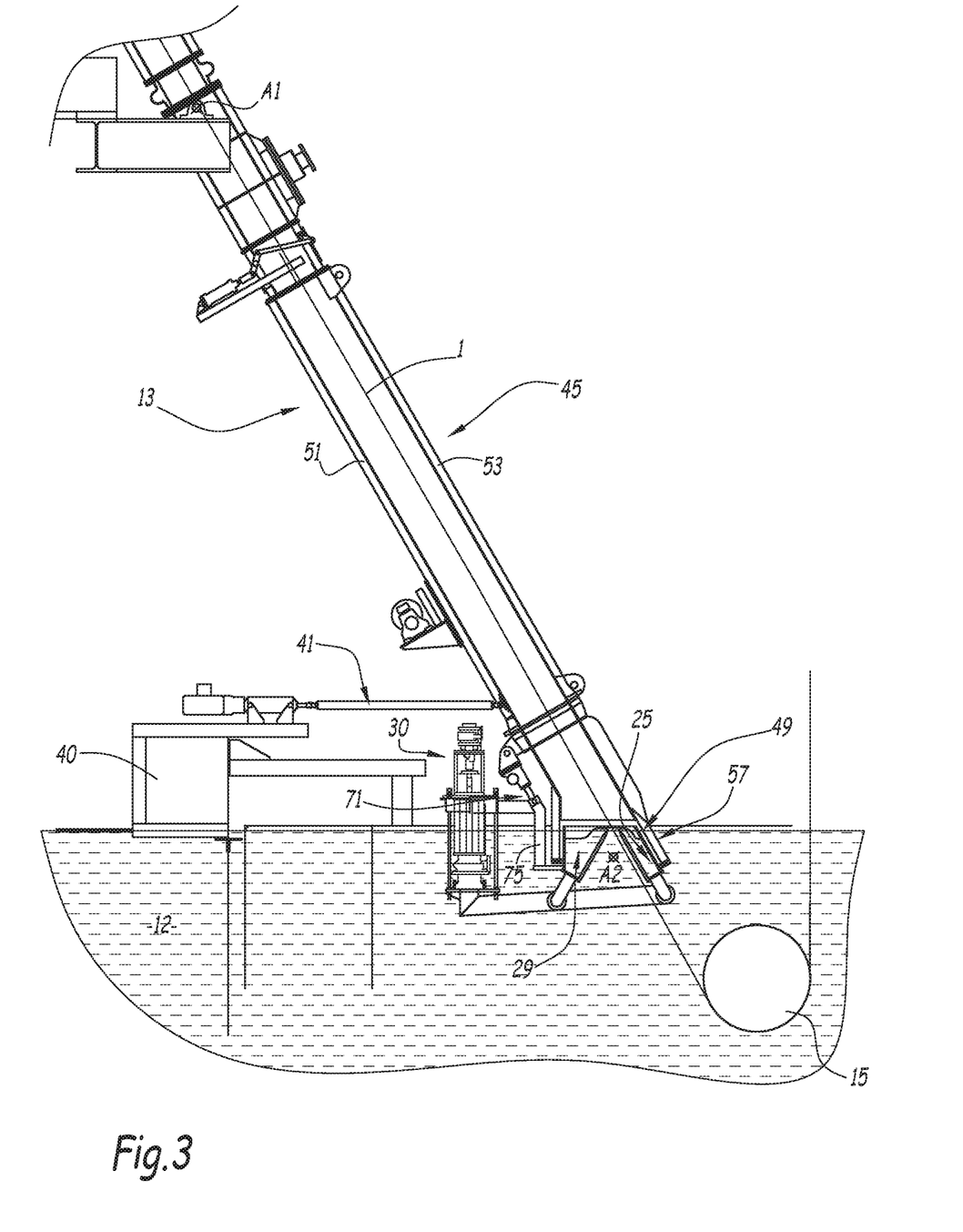
FIG. 3 is a schematic view of the coating apparatus of FIG. 1, illustrating certain aspects in more detail.
Figure 5:
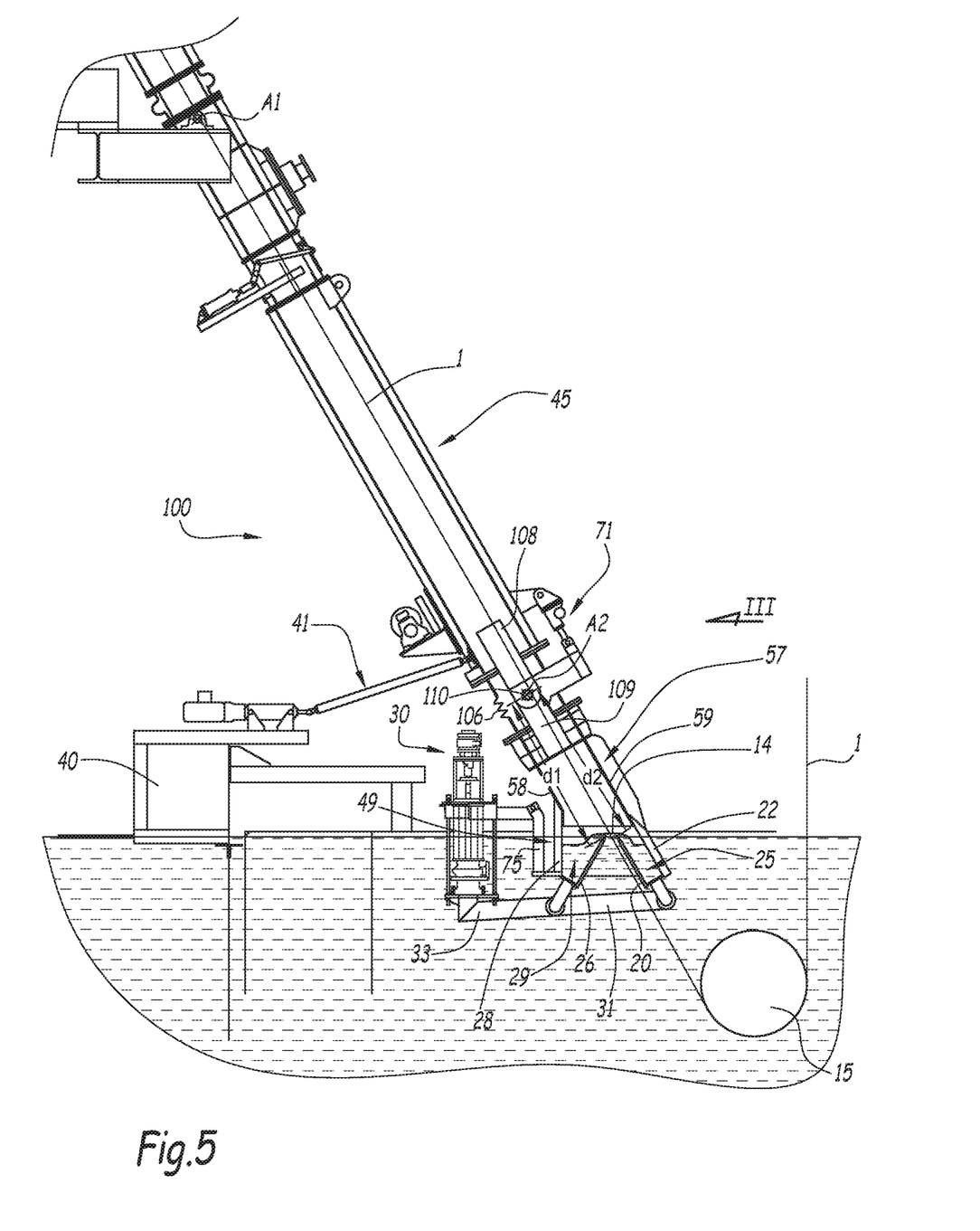
FIG. 5 is a schematic view of part of a coating apparatus according to a second embodiment.

As shown in FIGS. 1, 3 and 5, the casing 13 bears, at its lower end, a pouring box 49 delimiting two compartments 25, 29 for pouring liquid metal. The compartments 25, 29 are located laterally inside the casing 13.

More particularly, the pouring box 49 includes a front compartment 25 for pouring liquid metal, located facing the face of the strip 1 located on the side of the bottom roller 15. The front compartment 25 is inwardly delimited by an inner wall 20 oriented toward the surface of the liquid seal 14, and outwardly by an outer wall 22. The outer wall 22 extends facing the face of the strip 1 located on the side of the bottom roller 15. It is formed by an outer wall of the pouring box 49.

The upper rim 21 of the inner wall 20 is positioned below the surface of the liquid seal 14 and the compartment 25 is provided with means for keeping the level of liquid metal in said compartment 25 at a level below the surface of the liquid seal 14 in order to produce a natural flow of liquid metal from said surface of said seal 14 toward said compartment 25.

Likewise, the pouring box 49 includes a rear compartment 29 for pouring liquid metal, located facing the face of the strip 1 which is not located on the side of the bottom roller 15. The rear compartment 29 is inwardly delimited by an inner wall 26 oriented toward the surface of the liquid seal 14, and outwardly by an outer wall 29. The outer wall 28 extends facing the face of the strip 1 which is not located on the side of the bottom roller 15. It is formed by an outer wall of the pouring box 49.

The upper rim 27 of the inner wall 26 is positioned below the surface of the liquid seal 14 and the compartment 29 is provided with means for keeping the level of liquid metal in said compartment 29 at a level below the surface of the liquid seal 14 in order to produce a natural flow of liquid metal from said surface of said liquid seal 14 toward said compartment 29.

Figure 2:
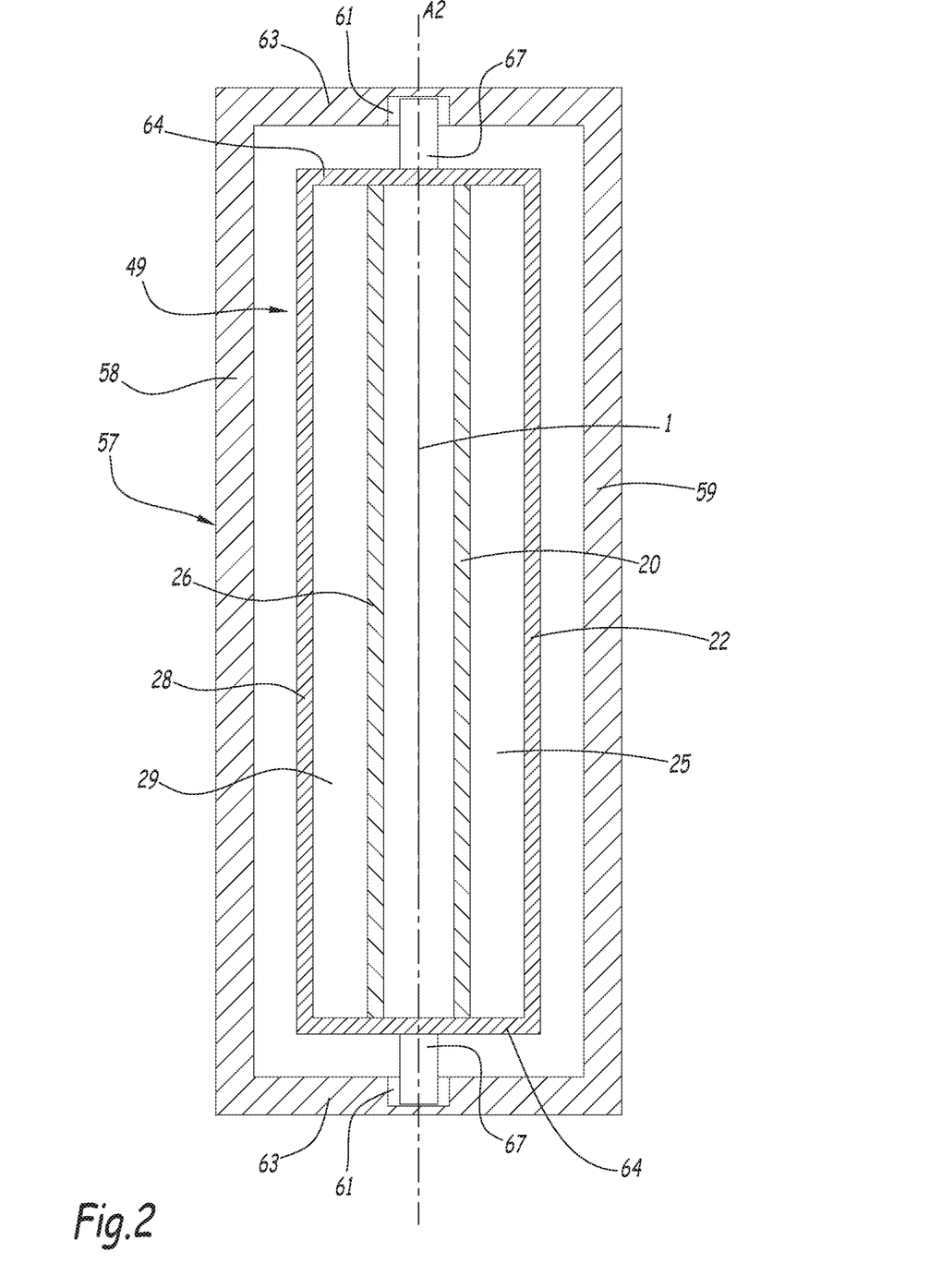
FIG. 2 is a top view along plane II-II of FIG. 1.

As shown in FIG. 2, the outer walls 22, 28 are connected to one another by side walls 64 extending facing edges of the strip 1.

Throughout the following description, these two compartments 25, 29 communicate with one another to form a single peripheral compartment. It is of course completely possible to separate them using side walls, as well as to add side compartments facing the edges of the strip 1 to be coated.

Advantageously, the fall height of the liquid metal into the compartments 25 and 29, i.e., the distance along a vertical direction between the upper rims 21, 27 and the liquid metal level in the compartments 25, 29, is determined to prevent the metal oxide particles and inter-metallic compounds from rising countercurrent with respect to the flow of the liquid metal. This fall height may be greater than or equal to 40 mm, or even greater than or equal to 50 mm, and preferably greater than or equal to 100 mm.

As illustrated in FIG. 1, the means for maintaining the liquid metal level in the pouring compartments 25 and 29 include at least one pump 30 connected on the suction side to said compartment 25 and 29 by a suction tubing, respectively 31 and 33. The pump 30 is provided on the discharge side with a discharge tubing 32, configured to discharge the liquid metal withdrawn by the pump 30 in the volume of the bath 12.

Furthermore, the apparatus 10 comprises means for detecting the liquid metal level in the pouring compartments 25, 29.

Advantageously, said detection means are formed by a reservoir 35 arranged outside the casing 13 and the compartments 25, 29, and connected to the base of each of the compartments 25 and 29 by a connecting pipe, respectively 36 and 37. In another embodiment, it is possible to use a single connecting pipe.

As shown in FIG. 1, the connecting point of the pump 30 on the pouring compartments 25 and 29 is located above the connecting point of the reservoir 35 on said compartments 25 and 29.

The addition of the external reservoir 35 makes it possible to duplicate the level of the pouring compartments 25 and 29 on the outside of the casing 13 in a favorable environment so as to detect this level easily. To that end, the reservoir 35 may be equipped with a liquid metal level detector, for example a contactor feeding an indicator, a radar or a laser beam.

Alternatively, any other means making it possible to detect the liquid metal level in the pouring compartments 25, 29 may be used.

The continuous detection of the liquid metal level in the pouring compartments 25 and 29 makes it possible to adjust this level so as to keep it below the surface of the liquid seal 14, while advantageously respecting the fall height described above.

Advantageously, the pump 30 is adjusted to a predetermined constant flow rate and the adjustment of the liquid metal level is done by introducing metal ingots into the vessel 11 when the detected liquid metal level is below a predetermined level. It is also possible to use a variable-flow pump that allows, in combination with the means for detecting the equipment level in the pouring compartments 25, 29, a faster adjustment of the galvanizing conditions.

As shown in FIG. 4, the casing 13 includes an upper part 45 and a lower part 57 at least partially immersed in the liquid metal bath 12.

In the illustrated embodiment, the upper part 45 includes two side walls 51, 53 substantially parallel to one another, and substantially parallel to the passage plane PP of the strip 1.

The pouring box 49 is carried by the lower portion 57 of the casing 13. More particularly, as shown in FIG. 4, the pouring box 49 is inserted into the lower end of the lower portion 57 while extending partially inside the casing 13. It protrudes downwardly past the lower end of the casing 13.

Advantageously, the apparatus 10 includes a sealing gasket 60 arranged between the lower end of the casing 13 and the pouring box 49 so as to prevent liquid metal from the bath 12 from penetrating between these two elements. As an example, the sealing gasket 60 is formed by a bellows secured to the pouring box 49 by one of its ends, and in particular by its lower end, and to the casing 13 by the other of its ends, in particular by its upper end. Such a bellows is for example made from steel. Such a bellows makes it possible to produce the sealing between the pouring box 49 and the casing 13 while allowing a relative rotation between these two parts.

As shown in FIG. 3, the casing 13 and the pouring box 49 are rotatable jointly around a first rotation axis A1. The pouring box 49 and the casing 13 are fixed in rotation around the first rotation axis A1. The first rotation axis A1 is substantially horizontal.

The rotation of the casing 13 and the pouring box 49 around the first rotation axis A1 results in a change in the distance between the upper rims 21, 27 of the pouring compartments 25, 29 and the metal strip 1, and thus allows a positioning of the strip 1 relative to said rims 21, 27.

The pouring box 49 is further rotatable relative to the upper portion 45 of the casing 13 around a second rotation axis A2. The second rotation axis A2 is substantially horizontal.

More particularly, as shown in FIG. 2, the second rotation axis A2 is oriented so as to pass through the walls of the casing 13.

In particular, the distance d1, d2 between the second rotation axis A2 and each of the rims 21, 27 of the pouring compartments 25, 29 is less than or equal to 2500 mm. This distance is advantageously comprised between 0 mm and 400 mm.

In this embodiment, the second rotation axis A2 is located below the upper rims 21, 27.

The first and second rotation axes A1, A2 are parallel to one another.

The rotation of the pouring box 49 around the second rotation axis A2 makes it possible to adjust the horizontality of the pouring box 49 independently of the rotational movement potentially performed around the first rotation axis A1 by the assembly made up of the casing 13 and the pouring box 49.

The particular location of the second rotation axis A2 makes it possible to perform this adjustment through a particularly small movement amplitude, in particular of the order of a few degrees.

The pouring box 49 is considered to be horizontal when the upper rims 21, 27 are located in a same horizontal plane defined with a tolerance of plus or minus 5 mm. In other words, a maximum altitude difference of 10 mm is tolerated between the two upper rims 21 and 27.

Optionally, the casing 13 is also translatable along its longitudinal axis so as to adjust its immersion height in the liquid metal bath 12, for example using a bellows system. Such an adjustment mechanism is known and will not be described in detail in this patent application.

The apparatus 10 also includes a mechanism for adjusting the horizontality of the upper rims 21, 27. More particularly, the mechanism for adjusting the horizontality of the upper rims 21, 27 is configured to adjust the horizontality of the second rotation axis A2.

More particularly, the pouring box 49 is articulated on the casing 13 via a pivot link allowing the rotation of the pouring box 49 relative to the casing 13 around the second rotation axis A2. Such a pivot link includes a pivot, for example in the form of a shaft, shaft segment or journal received in a bearing, the pivot extending along the second rotation axis A2. The pivot is formed on the casing 13.

As illustrated in FIGS. 1 to 4, the pouring box 49 forms a separate part from the casing 13. It is mounted rotatable on the lower portion 57 of the casing 13. As can be seen in FIG. 2, the pouring box 49 is mounted rotatable on the lower portion 57 of the casing 13 via journals 67, mounted rotatable in rotational guide bearings 61. The journals 67 define the rotation axis A2.

In the illustrated embodiment, the journals 67 are formed on the pouring box 49 and the bearings 61 are formed on the casing 13. More particularly, the rotational guide bearings 61 are formed in the lower portion 57 of the casing 13, while being arranged on two opposite faces 63 of the casing 13. They are substantially coaxial with the axis A2. Each guide bearing 61 receives a respective journal 67 formed on the pouring box 49.

Alternatively, the journals 67 are formed on the casing 13, and more particularly in its lower portion 57, and the guide bearings 61 are formed on the pouring box 49.

In the apparatus 10 according to the first embodiment, the second rotation axis A2 is immersed in the liquid metal bath 12. More particularly, the second rotation axis A2 passes between the two pouring compartments 25, 29, while being arranged below the upper rims 21, 27 of the pouring compartments 25, 29. Such positioning of the second rotation axis A2 is advantageous, since it results in a relatively small rotation radius of the upper rims 21, 27 around the second rotation axis, which facilitates the precise adjustment of the horizontality of the pouring box 49.

As can be seen in FIG. 3, the apparatus 10 includes a first actuator 41, configured to rotate the casing 13 around the first rotation axis A1 relative to the strip 1.

In the illustrated embodiment, the first actuator 41 assumes the form of an actuating jack. This actuating jack is arranged between a stationary frame 40 of the apparatus 10 and the casing 13, more particularly the upper portion 45 of the casing 13. As illustrated in FIGS. 3 and 4, the first actuator 41 acts on the casing 13 at the lower end of the portion 45.

For example, the first actuator 41 is formed by a screw jack. However, alternatively, the first actuator 41 is of any other suitable type, and for example includes a hydraulic or pneumatic jack.

As can be seen in FIG. 4, the apparatus 10 advantageously further includes a tool 42 for viewing the relative distance between each of the upper rims 21, 27 of the pouring compartments 25, 29 and the metal strip 1. More particularly, the viewing tool 42 includes a camera arranged in the casing 13 so as to allow the simultaneous viewing of the upper rims 21, 27 and the edge of the strip 1. This viewing tool 42 has been shown only schematically in FIG. 4.

According to one embodiment, the apparatus 10 includes control means (not shown), configured to control the first actuator 41 from relative positions of the upper rims 21, 27 and the strip 1 that are determined using the viewing tool 42.

The apparatus 10 further includes a second actuator 71, configured to rotate the pouring box 49 around the second rotation axis A2 relative to the casing 13.

In the embodiment shown in FIGS. 3 and 4, the second actuator 71 assumes the form of an actuating jack, and in particular a screw jack. However, alternatively, the second actuator 71 is of any other suitable type, and for example includes a hydraulic jack.

Advantageously, the apparatus 10 further includes a measuring sensor 72 configured to measure the incline angle of the pouring box 49 relative to the horizontal. This measuring sensor 72 has been shown only schematically in FIG. 4.

Optionally, the apparatus 10 also includes control means (not shown) for the second actuator 71, configured to control the second actuator 71 based on the incline angle measured by the measuring sensor 72. More particularly, these control means are configured to control the rotation of the pouring box 49 relative to the casing 13 around the second rotation axis A2 until the pouring box 49 is oriented horizontally, i.e., until the upper rims 21, 27 are located in a same horizontal plane.

As illustrated in FIGS. 3 and 4, the apparatus 10 includes a support chassis 75 for the pouring box 49, as well as the pump 30 and ducts associated with the pump 30.

The support chassis 75 is fixed in rotation relative to the casing 13 around the first rotation axis A1. It is further fixed in rotation relative to the pouring box 49 around the second rotation axis A2.

The pump 30 is mounted stationary on said support chassis 75. As previously explained, the pump 30 is connected to the pouring compartments 25, 30 via suction tubings 31 and 33. These suction tubings 31, 33 are rigid ducts, mounted stationary on the pouring box 49 and on the pump 30. The discharge tubing 32 is also formed by a rigid duct mounted stationary on the pump 30. The suction tubings 31, 33 and the discharge tubing 32 are fixed in rotation relative to the pouring box 49 and the pump 30.

When the apparatus 10 includes a reservoir 35 for viewing the liquid metal level in the pouring compartments 25, 29 as previously defined, the latter is advantageously mounted stationary relative to the support chassis. Thus, the viewing reservoir 35 is fixed in rotation relative to the support chassis. It will be noted that in order to simplify FIGS. 3 and 4, the viewing reservoir 35 has been omitted from these Figures.

In the embodiment in FIGS. 3 and 4, the support chassis 75 is connected to the casing 13 via the jack 71 for rotating the pouring box 49. As illustrated more particularly in FIG. 4, in this particular embodiment, the body 77 of the jack 71 is mounted pivoting relative to the casing 13 around a rotation axis A3 parallel to the rotation axis A2, and the rod 79 of the jack 71 is connected to the support chassis 75 while being rotatable relative to the support chassis 75 around a rotation axis A4 parallel to the rotation axis A2. Thus, the variation in the length of the jack 71 causes the support chassis 75 and the pouring box 49 to rotate around the rotation axis A2.

The shape of the pouring compartments 25 and 29 will now be explained in more detail in view of FIG. 4.

In the apparatus 10 illustrated in FIGS. 1 to 4, an upwardly extending plane PO of the outer wall 28 of the rear pouring compartment 29 intersects the passage plane PP to form, in a usage configuration of the coating apparatus 10, an angle α strictly greater than 0° with the passage plane PP of the strip 1, and for example greater than or equal to 15°, and advantageously greater than or equal to 25°, or even greater than or equal to 30°. Indeed, it has been observed that the more the angle increases, the more the efficiency increases as well.

Usage configuration refers to the configuration of the coating apparatus 10 when the metal strip 1 travels through the apparatus 10 in order to be coated by passing in the liquid metal bath 12.

In particular, in the usage configuration, the two upper rims 21, 27 of the two pouring compartments 25, 29 are located in a same horizontal plane.

The inventors of the present invention have noted that such a configuration of the outer wall 28 is particularly advantageous. In particular, it makes it possible to obtain, on the side of the face of the metal strip 1 facing the pouring compartment 29, a coating having a very low defect density, while limiting the bulk of the coating apparatus 10.

Indeed, they have noted that when the outer wall 28 of the rear pouring compartment 29 is oriented parallel to the metal strip 1, part of the liquid metal cascading in the pouring compartment 29 from the liquid metal seal surface 14 falls onto the outer wall 28 of the pouring compartment 29, then is projected on the face of the strip 1 facing the pouring compartment 29, thus creating appearance flaws on this face of the strip 1. This splashing phenomenon results from the fact that the outer wall 28 extends approximately perpendicular to the fall direction of at least part of said liquid metal cascade.

On the contrary, the orientation of the outer wall 28 as described above makes it possible to reduce such projections, and therefore results in a better appearance quality of the affected face of the strip 1. Indeed, in this case, the outer wall 28 extends more tangentially to the general flow direction of the cascade of liquid metal.

As illustrated in FIGS. 1 to 4, the outer wall 28 of the rear pouring compartment 29 is oriented so as to move away from the passage plane PP of the strip 1 from its upper end toward the bottom of the rear pouring compartment 29.

The angle α between the outer wall 28 and the passage plane PP of the strip 1 is strictly greater than 0° and may be less than, greater than or equal to $\alpha_0$, where $\alpha_0$ is the angle between the passage plane PP of the strip 1 and the vertical, knowing that the splash risk decreases when the angle α increases.

As an example, the outer wall 28 forms, with the passage plane PP of the strip 1, an angle α between $\alpha_0-10°$ and $\alpha_0+50°$, and more particularly between $\alpha_0$ and $\alpha_0+45°$.

All other things being equal, the splash risk is minimal when the outer wall 28 forms, with the strip 1, an angle α strictly greater than the angle $\alpha_0$ of the passage plane PP of the strip 1 with the vertical.

Preferably, the strip 1 forms an angle $\alpha_0$ with the vertical comprised between 25° and 50°. As an example, the strip 1 forms an angle $\alpha_0$ with the vertical approximately equal to 30°.

Advantageously, the inner wall 26 of the pouring compartment 29 is angled, from its upper rim 27 toward the bottom of the compartment 29, away from a median vertical plane P between the two rims 21, 27. In other words, the inner wall 26 of the pouring compartment 29 is angled, so as to move away from a vertical plane VPr passing through the upper rim 27 from its upper rim 27 toward the bottom of the compartment 29. It forms, with the vertical, an angle ε1 strictly greater than zero, as shown more particularly in FIG. 4.

Indeed, the inventors of the present invention have noted that such an incline made it possible to guide the flow of the liquid metal in the pouring compartment 29 globally along the inner wall 26 and thus to reduce the risks of splashing on the strip 1.

An incline by an angle ε1 greater than or equal to 15° is particularly advantageous to reduce the risks of splashing. As an example, the angle ε1 is greater than or equal to 20°, and more particularly greater than or equal to 25°.

On the contrary, when the inner wall 26 is inclined opposite the incline shown in the Figures of the present patent application, i.e., approaching said median vertical plane P toward the bottom of the compartment 29 or when the inner wall 26 is vertical, part of the liquid metal being poured into the compartment 29 risks falling substantially vertically directly into the liquid metal bath contained in the pouring compartment 29, which increases the risks of liquid metal being projected onto the strip 1.

The outer wall 22 of the front pouring compartment 25 is oriented substantially parallel to the passage plane PP of the strip 1. In the case of the pouring compartment 25, which is located on the side of the face of the strip 1 placed facing the bottom roller 15, this orientation makes it possible to avoid splashing on the strip 1, the outer wall 22 extending substantially tangentially to the general flow direction of the cascade of liquid metal being poured into the compartment 25.

Advantageously, the inner wall 20 of the pouring compartment 25 is angled, from its upper rim 21 and toward the bottom of the compartment 25, away from the median vertical plane P previously defined, as shown more particularly in FIG. 4. In other words, the inner wall 26 of the pouring compartment 25 is angled, so as to move away from a vertical plane VPf passing through the upper rim 21 from its upper rim 21 toward the bottom of the compartment 25. It forms, with the vertical, an angle ε2 strictly greater than zero.

Such an incline makes it possible to guide the flow of the liquid metal in the pouring compartment 25 globally along the inner wall 20 and thus to reduce the risks of splashing on the strip 1. An incline by an angle ε2 greater than or equal to 15° is particularly advantageous to reduce the risks of splashing.

Preferably, the angle ε2 is strictly greater than the angle $\alpha_0$ formed between the passage plane PP of the strip 1 and the vertical in order to prevent the strip 1 from rubbing on the inner wall 20 when it travels through the apparatus 10. For example, the angle ε2 is at least 3° greater than the angle $\alpha_0$. As an example, when the strip 1 forms an angle $\alpha_0$ of about 30° with the vertical, the angle ε2 is advantageously equal to about 35°. Such an angle also makes it possible to provide good guiding of the liquid metal along the inner wall 20.

According to one embodiment, the angles ε1 and ε2 are identical. They are for example equal to about 35°.

The inner 20, 26 and outer 28 walls of the pouring compartments 25, 29 are generally substantially flat. The aforementioned incline values are defined relative to the mean plane of the walls in question.

The angles α, ε1 and ε2 are defined in the usage configuration of the coating apparatus.

As illustrated in FIGS. 1, 3 and 4, the inner walls 20 and 26 are preferably tapered at their upper rims 21, 27 to facilitate a flow along the wall 20, 26 and avoid splashing the strip 1.

As an example, the upper rims 21 and 27 of the inner walls 20 and 26 of the pouring compartments 25 and 29 comprise, in the longitudinal direction, a series of hollows and protrusions in the shape of an arc of a circle.

In the embodiment illustrated in FIGS. 1 to 4, in which the lower portion 57 of the casing 13 extends partially facing the pouring box 49, the side wall 58 of the lower portion 57 of the casing 13 is, as an example, parallel to the outer wall 28 of the rear pouring compartment 29 in its portion located facing said outer wall 28. Thus, this side wall 58 forms an angle with the side wall 51 of the upper portion 45, which extends substantially parallel to the passage plane PP of the metal strip 1. Such a configuration makes it possible to limit the bulk of the casing 13.

Advantageously, the outer wall 22 of the pouring compartment 25 and the side wall 59 of the inner portion 57 of the casing 13 located facing said outer wall 22 are parallel. Such a configuration also contributes to limiting the bulk of the casing 13. More particularly, in the embodiment shown in FIGS. 1 to 4, the outer wall 22 of the front pouring compartment 25 extends substantially parallel to the passage plane PP of the strip 1. The side wall 59 of the lower portion 57 extends in the extension of the side wall 53 of the upper portion 45, and extends substantially parallel to the passage plane PP of the strip 1.

The outer walls 22, 28 of the pouring compartments 25, 29 extend laterally inwardly relative to the side walls 58, 59 of the lower portion 57.

The apparatus 10 according to the invention makes it possible to obtain coated metal strips 1 having a considerably lower defect density on each of their faces, and the appearance quality thus obtained of this coating is suitable for the criteria required by clients wishing to have parts with surfaces free of appearance defects.

Indeed, owing to the presence of the two pouring compartments 25, 29 on either side of the strip 1 and the system for maintaining an appropriate liquid metal level in these compartments 25, 29, the liquid seal surface 14 is cleaned continuously and on each side of the strip 1 of zinc oxides and mattes that may float there and that could create appearance defects in the coating.

Furthermore, the pivoting nature as a whole of the casing 13 and the pouring box 49 around the first rotation axis A1 and the pivoting mounting of the pouring box 49 on the casing 13 around the second rotation axis A2 make it possible to minimize the appearance defects of the coating on the two faces of the strip 1 independently of the position or characteristics of the bottom roller 15, and in particular in case of change in the characteristics or position of this roller 15.

Indeed, the passage plane PP of the strip 1 through the casing 13 is determined by the position of the bottom roller 15 in the liquid metal bath 12, as well as by the diameter of the bottom roller 15. Thus, each change of the bottom roller 15 is able to modify the passage line of the strip 1 in the casing 13, and therefore to off-center the pouring compartments 25, 29 relative to the strip 1. Likewise, the wear of the bottom roller 15 during the operation of the apparatus 1, which results in a reduction in its diameter, is also reflected by a change in the passage line of the strip 1 in the casing 13, and therefore an off-centering of the pouring compartments 25, 29 relative to the strip 1.

It is important for the passage line of the strip 1 to be substantially centered between the two pouring compartments 25, 29. Otherwise, the strip 1 risks touching the inner walls 20, 26 of these compartments 25, 29 when it travels through the casing 13.

The pivoting of the casing 13 and the pouring box 49 around the first rotation axis A1 makes it possible to re-center the pouring compartments 25, 29 relative to the strip 1 in case of change in the characteristics or position of the bottom roller 15.

However, the inventors of the present invention have noted that such centering by rotation around a rotation axis A1 has the drawback of changing the altimetry of the upper rims 21, 27. In other words, the rotation of the casing 13 around a rotation axis A1 causes a rotation of the upper rims 21, 27 of the compartments 25, 29 around a rotation axis A1, and one of these rims 21, 27 is then at a higher altitude than the other. Yet such a difference in altitude must be controlled, since an uncontrolled difference in altitude risks resulting in an imbalance of the pouring flow rates into the compartments 25, 29 from the liquid seal surface 14. At a constant pump 30 flow rate, such an imbalance in flow rates risks leading to an overflow of one of the compartments 25, 29, the mattes and oxides stored in said compartment 25, 29 then being in contact with the strip 1, and thus risking reducing the quality of the coating.

The apparatus 10 as described above makes it possible to resolve this drawback owing to the possibility of pivoting of the pouring box 49 relative to the casing 13 around the second rotation axis A2, such pivoting making it possible to reestablish the horizontality of the pouring box 49 and thus resulting in rebalancing of the pouring flow rates into each of the compartments 25, 29.

Furthermore, providing that the casing 13 and the pouring box 49 are made in two separate parts, the casing 13 and the pouring box being fixed in rotation around the first rotation axis A1 in order to center the strip 1, and the pouring box 49 being mounted rotating around a rotation axis A2 relative to the casing 13 by means of a bearing precisely defining the position of the rotation axis A2 relative to the casing 13, makes it possible to perform, very precisely and independently, on the one hand the centering of the pouring box 49 relative to the metal strip 1, and on the other hand the balancing of the flow rates between the two pouring compartments 25, 29.

In particular, the mechanism described in view of the first embodiment is much simpler and makes it possible to position the casing 13 relative to the strip 1 and to balance the flow rates much more precisely and flexibly than the structures described in the prior patent applications WO 02/38823 and KR 10-1533212.

Experiments done by the inventors have shown that small angular movements around the first and second rotation axes A1 and A2, in particular of a few degrees, are sufficient to obtain a satisfactory adjustment of the coating apparatus 10.

The small angular movement required around the first rotation axis A1 is advantageous inasmuch as the coating apparatus 10 is generally located in a cluttered environment, not allowing substantial angular movements of the casing 13 as a whole.

Furthermore, the small angular movement necessary for the rotation of the pouring box 49 makes it possible to authorize the rebalancing, while maintaining good sealing between the pouring box 49 and the casing 13, by simply providing, between the pouring box 49 and the casing 13, a sealing gasket 60 deformable enough to allow the angular movement of the pouring box 49.

On the contrary, in the apparatuses described in WO 02/38823 and KR 10-1533212, which do not include a separate rotation axis of the pouring box 49 relative to an upper portion of the casing 13, much greater movements will be necessary to obtain the desired adjustment.

The implementation of a separate rotation axis A2 of the pouring box 49 relative to an upper portion of the casing 13 according to the invention further increases the adjustment span relative to the apparatuses described in WO 02/3823 and KR 10-1533212. Indeed, in the prior apparatuses, the possible adjustment angle is limited by the maximum possible rotation angle of the casing around the single rotation axis based on the position of the strip and the constraints of the system.

A method for continuous hot dip coating of a metal strip 1 using the apparatus 10 according to the first embodiment will now be explained.

This method includes adjusting the coating apparatus 10, in particular after changing the bottom roller 15.

During a step for adjusting the position of the pouring box 49 relative to the metal strip 1, and more particularly for centering said box 49 relative to the metal strip 1, the casing 13 is rotated around the first rotation axis A1 so as to center the metal strip 1 relative to the upper rims 21, 27 of the pouring compartments 25, 29.

Advantageously, during this step, the relative position of the upper rims 21 and 27 with respect to the metal strip 1 is detected using the viewing tool 42 and the movement of the casing 13 is controlled based on the position thus determined.

According to one embodiment, the rotational movement of the casing 13 is controlled by an operator acting on the first actuator 41 based on the respective position of the upper rims 21 and 27 and the metal strip 1 determined using the viewing tool 42. The operator may be a person or an automatism a computer.

Alternatively, the positioning of the pouring box 49 relative to the strip 1 is done automatically by control means configured to control the first actuator 41 based on the relative positions determined using the viewing tool 42.

During a rebalancing step, following the adjusting step, the pouring box 49 is rotated relative to the upper portion 45 of the casing 13 around the second rotation axis A2 so as to make the pouring box 49 horizontal.

More particularly, during this step, the pouring box 49 is rotated around the second rotation axis A2 relative to the lower portion 57 of the casing 13.

According to one embodiment, during this step, the control means control the rotation of the pouring box 49 based on measurements taken by the incline sensor 72.

Alternatively, this rotation is controlled by an operator acting on the second actuator 71 based on the incline measured by the incline sensor 72 or observed by the operator.

At the end of this second step, the strip 1 is substantially centered relative to the upper rims 21, 27 and these rims 21, 27 are arranged in a same horizontal plane.

Optionally, if the positioning is not satisfactory at the end of the second step, the centering step is reiterated, and optionally the rebalancing step, as often as necessary in order to obtain a satisfactory positioning of the upper rims 21, 27 relative to the strip 1.

In order to verify whether the positioning is satisfactory, it is possible to run the coating apparatus 10 in order to verify, on the one hand, whether the strip 1 touches the upper rims 21, 27 during its travel, and on the other hand, whether the pouring flow rate is well-balanced between the two pouring compartments 25, 29.

If centering or horizontality defects are observed at this stage, the apparatus 10 is stopped, and the centering and rebalancing steps are carried out again.

According to one embodiment, before the first centering step above, the horizontality of the upper rims 21, 27 is adjusted using the mechanism for adjusting the horizontality of said rims 21, 27. More particularly, during this step, one acts on the rotation axis A2 so as to adjust its horizontality.

As an example, during this step, the surface of the liquid metal bath 12 is chosen as horizontality reference to carry out this adjustment.

The adjustment of the horizontality of the upper rims 21, 27 is in particular carried out after replacing the pouring box 49.

Optionally, before the first centering step above, the casing 13 is translated along its axis so as to adjust its immersion height in the liquid metal bath 12. Such an adjustment is known and will not be described in detail in this patent application.

It will be noted that the invention applies to any metal coating by dipping.

Figure 6:
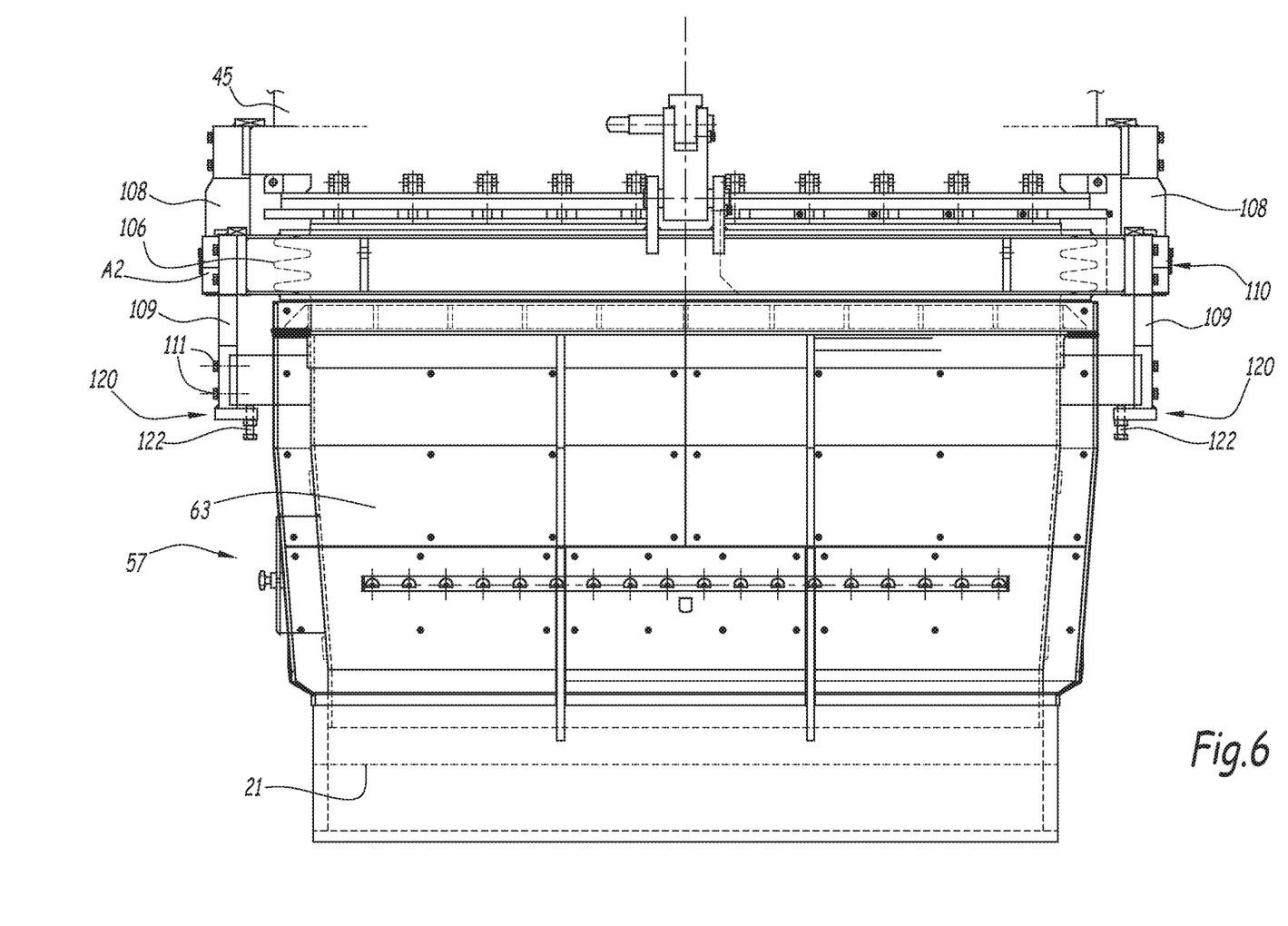
FIG. 6 is a schematic view along III of part of the coating apparatus of FIG. 5.

An apparatus 100 according to a second embodiment will now be described in reference to FIGS. 5 and 6. Only the differences with respect to the first embodiment will be described. In FIGS. 5 and 6, the identical or similar elements bear numerical references identical to those used for the first embodiment.

The apparatus 100 according to the second embodiment differs from the apparatus 10 in particular by the location of the second rotation axis A2.

As previously explained, in the first embodiment, the pouring box 49 is carried by the lower portion 57 of the casing 13 while being mounted rotating on the latter around the second rotation axis A2.

In the apparatus 100 according to the second embodiment, and as shown in FIG. 5, the pouring box 49 is carried by the lower portion 57 of the casing 13 while being stationary relative thereto. The lower portion 57 of the casing 13 is in turn mounted rotating on the upper portion 45 of the casing 13 around a second rotation axis A2. Thus, the pouring box 49 is rotatable around the rotation axis A2 relative to the upper portion 45 of the casing 13.

More specifically, in this embodiment, the outer walls of the pouring box 49 formed by the outer walls 22, 28 of the pouring compartments 25, 29 are formed by the side walls 58, 59 of the lower portion 57 of the casing 13. Thus, the pouring box 49 is, in this embodiment, integrated into the lower portion 57 of the casing 13.

As shown in FIGS. 5 and 6, the lower portion 57 of the casing 13 is articulated on the upper portion 45 of the casing 13 via a pivot link allowing the rotation of the pouring box 49 relative to the upper portion 45 of the casing 13 around the second rotation axis A2.

As shown in FIG. 5, the rotation axis A2 passes through the walls of the casing 13.

In this apparatus 100, the second rotation axis A2 is located outside the liquid metal bath 12. In particular, the second rotation axis A2 is located above the pouring compartments 25, 29.

In particular, the distance d1, d2 between the second rotation axis A2 and each of the rims 21, 27 of the pouring compartments 25, 29 is less than or equal to 2500 mm. This distance is advantageously between 800 mm and 1400 mm.

More particularly, the apparatus 100 includes two shaft segments 110 defining the rotation axis A2.

In the embodiment illustrated in FIGS. 5 and 6, the articulation allowing the rotation around the second rotation axis A2 is formed outside the passage channel of the strip 1 delimited by the casing 13. In particular, it is formed on the casing 13.

In this embodiment, the upper portion 45 of the casing 13 is provided with two upper articulation arms 108. Each of these upper articulation arms 108 receives, at its lower end, a shaft segment 110, said shaft segment 110 rotatably receiving a lower articulation arm 109 secured to the lower part 57 of the casing.

The articulation arms 108, 109 more particularly assume the form of articulation yokes rotatably connected via the shaft segment 110.

Alternatively, any other articulation mechanism creating a pivot link between the pouring box 49 and the upper portion 45 of the casing 13 around a rotation axis A2 can be considered.

The second actuator 71 assumes the form of an actuating jack, arranged between the lower portion 57 and the upper portion 45 of the casing 13, so as to rotate the pouring box 49 around the second rotation axis A2 relative to the upper portion 45 of the casing 13. The second actuator 71 is in particular a screw jack. However, alternatively, the second actuator 71 is of any other suitable type, and for example includes a hydraulic or pneumatic jack.

Like in the first embodiment, the apparatus 100 further includes a measuring sensor configured to measure the incline angle of the pouring body 49 relative to the horizontal and means for controlling the second actuator 71, configured to control the second actuator 71 based on the incline angle measured by the measuring sensor 72.

In the illustrated embodiment, the apparatus 100 further includes sealing means 106, arranged between the lower end of the upper portion 45 of the casing 13 and the upper end of the lower portion 57. The sealing means 106 are configured to prevent air from entering the casing 13 from the environment. They for example include a bellows extending between the lower end of the upper portion 45 and the upper end of the lower portion 57 of the casing 13.

This bellows also plays a compensating role allowing the relative movement of the lower portion 57 with respect to the upper portion 45 of the casing 13.

The apparatus 100 further includes a mechanism 120 for adjusting the horizontality of the upper rims 21, 27 of the inner walls 20, 26 of the compartments 25, 29.

One example of such a mechanism 120 is more particularly illustrated in FIG. 6. In this example, the mechanism 120 includes, on the side of each of the ends of the upper rims 21, 27, at least one adjusting screw 122 configured to adjust the height of said end. More particularly, each adjusting screw 122 is configured to act on a corresponding part of the lower portion 57 of the casing 13.

In the embodiment illustrated in FIG. 6, the adjusting screws 122 are provided at the lower articulation arm 109 of the articulation mechanism of the lower portion 57 on the upper portion 45 of the casing 13. They are arranged such that their screwing or unscrewing results in a vertical movement of the corresponding portion of the lower portion 57 relative to the lower articulation arm 109, and thus indirectly in an adjustment of the height of the corresponding end of the upper rims 21, 27. In this example, the lower articulation arm 109 is secured to the lower portion 57 via securing screws 111 passing in oblong orifices of the lower articulation arm 109, thus making it possible to adjust the position of the lower portion 57 relative to the lower articulation arm 109.

In this embodiment, the lower portion 57 includes an upper segment and a lower segment, fastened on the upper segment. The upper segment is not intended to be immersed in the liquid metal bath 12. The lower segment is intended to be immersed at least partially in the liquid metal bath 12. The lower segment is in particular attached on the upper segment by welding. The outer walls 22, 28 of the pouring compartments 25, 29 are formed by the side walls of the lower segment of said lower portion 57.

As shown in FIG. 5, the pump 30 is partially immersed in the liquid metal bath 12. It is fixed in rotation relative to the pouring box 49 via a chassis 75 fastened on the lower portion 57 of the casing 13. The suction tubings 31, 32 are rigidly fastened between the pump 30 and the pouring box 49. Thus, the pump 30 and the suction tubings 31, 32 are rotatable with the pouring box 49 around the first rotation axis A1 relative to the frame 40 with the apparatus 100 and around the second rotation axis A2 relative to the upper portion 45 of the casing 13.

In the embodiment illustrated in FIG. 5, the orientations of the inner 20, 26 and outer 22, 28 walls of the compartments 25, 29 are similar to those described in view of the first embodiment, and generate the same advantages.

The apparatus 100 according to the second embodiment has most of the advantages provided by the apparatus 10 according to the first embodiment.

Furthermore, in this embodiment, the location of the second rotation axis A2 outside the liquid metal bath 12 is advantageous, since it avoids having to provide sealing between the pouring box 49 and the main descent 45 into the liquid metal bath.

Conversely, in this embodiment, in view of the location of the second rotation axis A2, the distance between the second rotation axis A2 and the rims 21, 27 of the pouring compartments 25, 29 is greater than this distance in the first embodiment, which risks increasing the overall bulk of the equipment 100.

The method for adjusting the apparatus 100 according to the second embodiment is similar to the method for adjusting the apparatus 10 according to the first embodiment. It will, however, be noted that during the step for rebalancing the flow rates, more particularly, the lower portion 57 of the casing 13 provided with its pouring box 49 is rotated around the second rotation axis A2 relative to the upper portion 45 of the casing 13.

Advantageously, the method for adjusting the apparatus 100 further includes a step for adjusting the horizontality of the upper rims 21, 27 via the adjusting mechanism 120. In particular, this step includes the screwing or unscrewing of the adjusting screws 122 based on any observed horizontality flaw of the rims 21, 27 so as to reestablish the horizontality of the rims 21, 27.

This adjustment is in particular done by using the surface of the liquid metal bath 12 as horizontality reference.

It is done by an operator, who may be a person or an automatism a computer.

The adjustment of the horizontality of the upper rims 21, 27 is in particular carried out after replacing the lower portion 57 of the casing 13 provided with its pouring box 49.

At the end of the step for adjusting the horizontality, each of the upper rims 21, 27 extends horizontally.

It will be noted that the invention described above in view of FIGS. 1 to 6 has two aspects, namely on the one hand the pivoting nature of the casing 13 and the pouring box 49 around the first rotation axis A1 and the rotatable mounting of the pouring box 49 relative to the upper portion 45 of the casing 13 around the second rotation axis A2, as well as the characteristics related to the adjustment of the apparatus 10, 100 resulting therefrom, and on the other hand the particular shape of the pouring compartments 25, 29.

As previously explained, the characteristics related to the first aspect make it possible to center the strip 1 in the casing 13 and balance the pouring flow rates in the two compartments simply, flexibly and precisely, thereby resulting in an excellent appearance quality of the coating on each of its faces.

Furthermore, the characteristics related to the second aspect, and in particular the orientation of the outer wall 28 of the compartment 29, make it possible to reduce the risks of liquid metal splashing on the strip 1, thereby also contributing to improving the appearance quality of the coating on the two faces of the strip, and in particular on the face of the strip oriented opposite the bottom roller 15.

Although described in combination in view of FIGS. 1 to 6, these two aspects may be implemented independently of one another, each aspect, considered alone, already contributing to a significant improvement in the quality of the coating.

Implemented together, the two aspects of the present invention lead to an even better appearance quality of the coating of the strip on each of its faces than when only one of these aspects is implemented.

What is claimed is:

1. An apparatus for continuous hot dip coating of a metal strip, comprising:
   a vessel having a liquid metal bath, the apparatus configured for operating in a usage configuration in which the metal strip travels through the apparatus and is hot dip coated by passing through a liquid metal in the liquid metal bath;
   a bottom roller arranged in the vessel, the bottom roller for immersing in the liquid metal bath;
   a displacement casing for the metal strip having a lower end for immersing in the liquid metal bath to define a liquid metal seal with a surface of the liquid metal bath and an inside of the displacement casing, the apparatus configured such that the metal strip travels through the displacement casing to the bottom roller along a passage plane; the displacement casing including a pouring box at the lower end, the pouring box delimiting a front pouring compartment for liquid metal located on a first side of the metal strip, the front pouring compartment facing a first face of the metal strip which faces the bottom roller, and a rear pouring compartment for liquid metal located on a second side of the metal strip, the rear pouring compartment facing a second face of the metal strip which does not face bottom roller, each of the front and rear pouring compartments being inwardly delimited by an inner wall and outwardly delimited by an outer wall, each inner wall including an upper rim below the liquid metal seal to produce a flow from the liquid metal seal into each of the front and rear pouring compartments, an upwardly extending plane of the outer wall of the rear pouring compartment and the passage plane of the metal strip configured to intersect to form an acute angle, the acute angle being greater than or equal to 15° in the usage configuration, the outer wall of the rear pouring compartment forming an outer wall of the pouring box.

2. The apparatus as recited in claim 1, wherein the outer wall of the rear pouring compartment is vertical in the usage configuration.

3. The apparatus as recited in claim 1, wherein the inner wall of the rear pouring compartment is angled to move away from a vertical plane passing through the upper rim, from the upper rim toward a bottom of the rear pouring compartment.

4. The apparatus as recited in claim 3, wherein the inner wall of the rear pouring compartment and the vertical plane passing through the upper rim form an angle, the angle being greater than or equal to 15° in the usage configuration.

5. The apparatus as recited in claim 1, wherein the inner wall of the front pouring compartment and a vertical plane passing through the upper rim form an angle, the angle being greater than or equal to 15° in the usage configuration.

6. The apparatus as recited in claim 5, wherein the inner wall of the front pouring compartment and the vertical plane passing through the upper rim form an angle in the usage configuration greater than an angle formed between the passage plane of the metal strip and the vertical plane passing through the upper rim.

7. The apparatus as recited in claim 1, wherein the inner walls of the front and rear pouring compartments are tapered at the upper rims.

8. The apparatus as recited in claim 1, wherein the displacement casing includes an upper portion and a lower portion, the lower portion including the pouring box, the displacement casing with the pouring box being rotatable relative to the metal strip around a first rotation axis and the pouring box being rotatable relative to the upper portion of the displacement casing around a second rotation axis.

9. The apparatus as recited in claim 8, wherein an articulation allowing the rotation of the pouring box relative to the upper portion of the displacement casing is a pivot link.

10. The apparatus as recited in claim 1, further comprising:
    an adjustment device for adjusting a horizontality of the upper rims of the inner walls of the front and rear pouring compartments.

11. The apparatus as recited in claim 8, wherein the pouring box is stationary relative to the lower portion of the displacement casing and the lower portion of the displacement casing is mounted rotatable around the second rotation axis on the upper portion of the displacement casing.

12. The apparatus as recited in claim 8, wherein the pouring box is rotatably mounted to rotate on the lower portion of the displacement casing.

13. A method for continuous hot dip coating of a metal strip comprising the step of:
    providing the coating apparatus as recited in claim 1; and
    depositing a coating on the metal strip.

14. The coating method as recited in claim 13, wherein the coating includes zinc and aluminum.

15. The coating method as recited in in claim 13, wherein the coating is a zinc-based coating.

16. The coating method as recited in claim 15, wherein the zinc-based coating includes between 0.1 and 0.3% aluminum.

17. The coating method as recited in claim 15, wherein the zinc-based coating includes 5% aluminum and a remainder is zinc.

18. The coating method as recited in claim 15, wherein the zinc-based coating includes magnesium.

19. The coating method as recited in claim 13, wherein the coating is an aluminum-based coating including silicon and iron.

20. The coating method as recited in claim 13, wherein during the coating of the metal strip, the outer wall of the rear pouring compartment and the metal strip form an angle greater than or equal to 15°.

21. The coating method as recited in claim 13, wherein during the coating of the metal strip, the inner wall of the rear pouring compartment is angled to move away from a vertical plane passing through the upper rim, from the upper rim toward the bottom of the rear pouring compartment.

22. The coating method as recited in claim 13, wherein during the coating of the metal strip, the inner wall of the rear pouring compartment and a vertical plane form an angle greater than or equal to 15°.

23. The coating method as recited in claim 13, wherein during the coating of the metal strip, the inner wall of the front pouring compartment and the vertical plane form an angle greater than or equal to 15°.

24. The coating method as recited in claim 13, wherein the inner wall of the front pouring compartment and a vertical plane form, in the usage configuration, an angle strictly greater than an angle formed between the metal strip and the vertical plane.

25. The coating method as recited in claim 14, wherein the coating is an aluminum-zinc coating.

26. The coating method as recited in claim 14, wherein the coating includes 55 wt% of aluminum, 43.5 wt% of zinc and 1.5 wt% of silicon.

27. The coating method as recited in claim 19, wherein the coating includes, in wt%:
8% <Si <11%; and
2% <Fe <4%;
a remainder being aluminum and any impurities.

28. The coating method as recited in claim 18, wherein the zinc-based coating includes aluminum.

29. The coating method as recited in claim 28, wherein the zinc-based coating includes from 0.1 to 20 wt% of aluminum and from 0.1 to 10 wt% of magnesium.

* * * * *